United States Patent
Nelson et al.

(10) Patent No.: US 8,256,085 B2
(45) Date of Patent: Sep. 4, 2012

(54) SYSTEM AND METHOD FOR CLASSIFYING WIRE

(75) Inventors: Neal R. Nelson, Mentor, OH (US); Raymond G. Bender, Willoughby, OH (US); Yonatan Necoechea, Richmond Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 961 days.

(21) Appl. No.: 12/272,464

(22) Filed: Nov. 17, 2008

(65) Prior Publication Data

US 2010/0122450 A1   May 20, 2010

(51) Int. Cl.
  *B23Q 17/00* (2006.01)
  *B07B 1/49* (2006.01)

(52) U.S. Cl. .................................... 29/407.05; 209/400

(58) Field of Classification Search .................. 209/400; 226/43, 45; 29/407.05, 742; 705/400; 72/41–51
See application file for complete search history.

(56) References Cited

U.S. PATENT DOCUMENTS

| | | | | |
|---|---|---|---|---|
| 3,210,838 A | * | 10/1965 | Nast et al. | 228/102 |
| 3,323,701 A | * | 6/1967 | Gurski et al. | 226/43 |
| 3,789,295 A | * | 1/1974 | Balchunas et al. | 324/515 |
| 3,823,370 A | * | 7/1974 | Pendleton et al. | 324/515 |
| 3,961,522 A | * | 6/1976 | Kilen | 73/609 |
| 4,156,500 A | | 5/1979 | Yoshida et al. | |
| 4,209,744 A | * | 6/1980 | Gerasimov et al. | 324/241 |
| 4,329,861 A | | 5/1982 | Griffiths | |
| 4,552,599 A | * | 11/1985 | Masuda et al. | 156/50 |
| 4,808,926 A | * | 2/1989 | Graham et al. | 324/226 |
| 5,189,897 A | | 3/1993 | Lionetti et al. | |
| 5,201,206 A | | 4/1993 | Russo | |
| 5,209,092 A | | 5/1993 | Russo | |
| 5,240,194 A | * | 8/1993 | Noirot et al. | 242/418.1 |
| 5,277,044 A | | 1/1994 | Samyn | |
| 5,366,569 A | | 11/1994 | Muller et al. | |
| 5,582,051 A | * | 12/1996 | Ishikawa et al. | 72/3 |
| 5,628,218 A | * | 5/1997 | Yamada et al. | 72/16.2 |
| 5,953,944 A | | 9/1999 | Groening et al. | |
| 6,054,675 A | | 4/2000 | Kurokawa et al. | |
| 6,715,331 B1 | | 4/2004 | Zelin et al. | |
| 6,772,974 B2 | * | 8/2004 | Gallagher et al. | 242/478.2 |

FOREIGN PATENT DOCUMENTS

WO   2010/055383   5/2010

OTHER PUBLICATIONS

International Search Report and Written Opinion from PCT/IB09/07349 dated Mar. 17, 2010.

* cited by examiner

*Primary Examiner* — David Bryant
*Assistant Examiner* — Jacob Cigna
(74) *Attorney, Agent, or Firm* — Calfee, Halter & Griswold LLP (57) ABSTRACT

A quantity of wire is associated with a number of interruptions that occurred during the production and/or subsequent processing of the wire. The number of interruptions is used to classify the wire as being of a particular quality and/or suitable for a particular task.

20 Claims, 9 Drawing Sheets

SYSTEM AND METHOD FOR CLASSIFYING WIRE

FIELD

The general inventive concepts relate, among other things, to the production of wire and, more particularly, to the production of wire classified based on production-related interruptions.

BACKGROUND

Metal wire has application in numerous fields and industries. For example, Metal Inert Gas (MIG) welding is a welding process which incorporates the automatic feeding of a continuous, consumable wire electrode that is shielded by an externally supplied gas. Copper-plated steel wire is often used as the consumable wire electrode in MIG welding. Copper-plated steel wire, for use as welding wire, has conventionally been differentiated based on certain characteristics of the wire (e.g., its composition and diameter) that may impact its performance during welding. These characteristics are predictable in that they are generally known prior to and/or controlled during the manufacturing process. Conversely, other characteristics of the welding wire that may impact its performance during welding are unpredictable because they result variably from unintended events arising during the manufacturing or subsequent processing of the wire.

SUMMARY

By way of example to illustrate various aspects of the general inventive concepts, methods and/or systems for manufacturing, transferring, classifying, certifying and pricing wire are disclosed herein.

A method of manufacturing wire (e.g., copper-plated steel wire) from a material (e.g., steel), according to one exemplary embodiment, is disclosed. The method includes forming the wire by continuously drawing the material through stations until a first predetermined quantity (e.g., 5000 lbs.) of the wire is placed on a first storage device; tracking a first number of interruptions in the drawing of the material through the stations; and associating the first number of interruptions with the first storage device. One of the stations can include, for example, a series of one or more dies, wherein the material undergoes plastic deformation as it is drawn through the dies. The method can also include continuously transferring a second predetermined quantity (e.g., 1000 lbs.) of the wire from the first storage device to a second storage device; tracking a second number of interruptions in the transfer of the wire from the first storage device to the second storage device; adding the first number of interruptions and the second number of interruptions to obtain a third number of interruptions; and associating the third number of interruptions with the second storage device.

A system for manufacturing wire (e.g., copper-plated steel wire) from a material (e.g., steel), according to one exemplary embodiment, is disclosed. The system includes a loading station for loading the material; a drawing station for transforming the material into the wire through plastic deformation of the material; and an unloading station for unloading the wire onto a first storage device. The system also includes means (e.g., motors) for drawing the material from the loading station, through the drawing station, to the unloading station; means (e.g., sensors) for tracking a first number of interruptions in the drawing of the material through the stations; and means (e.g., software, a data store) for associating the first number of interruptions with the first storage device. The system can also include a transfer station for transferring the wire from the first storage device to a second storage device; means (e.g., sensors) for tracking a second number of interruptions in the transfer of the wire from the first storage device to the second storage device; and means (e.g., software, a data store) for associating a sum of the first number of interruptions and the second number of interruptions with the second storage device.

A system for transferring wire (e.g., copper-plated steel wire) from a first storage device (e.g., a reel) to a second storage device (e.g., a box), according to one exemplary embodiment, is disclosed. The system includes an input station for unloading the wire from the first storage device; an output station for loading the wire to the second storage device; and a transfer station for moving the wire from the input station to the output station. The system also includes means (e.g., sensors) for tracking a number of interruptions in the moving of the wire from the input station to the output station; and means (e.g., software, a data store) for associating the number of interruptions with the second storage device.

A system for manufacturing wire (e.g., copper-plated steel wire) from a material (e.g., steel), according to one exemplary embodiment, is disclosed. The system includes a loading station for loading the material; a cleaning station for cleaning the material; a drawing station for reducing a diameter of the material; a plating station for depositing a layer of copper on the material; a coating station for applying a surface coating to the material to complete formation of the wire; and an unloading station for unloading the wire onto a storage device. The system also includes means (e.g., motors) for drawing the material through each of the stations; means (e.g., sensors) for tracking a number of interruptions in the drawing of the material from the loading station, through the cleaning station, drawing station, plating station and coating station, to the unloading station; and means (e.g., software, a data store) for associating the number of interruptions with the storage device.

A method of classifying wire (e.g., copper-plated steel wire) formed by a production process and stored on a storage device (e.g., as a boxed coil), according to one exemplary embodiment, is disclosed. The method includes assigning the wire to a first class if a number of interruptions that occurred during the production process is equal to a first value; assigning the wire to a second class if the number of interruptions that occurred during the production process is equal to a second value; and applying indicia to the storage device to indicate which of the first class and the second class the wire belongs, wherein the first value and the second value are different.

A method of classifying wire (e.g., copper-plated steel wire) formed by a production process and stored on a storage device (e.g., as a boxed coil), according to one exemplary embodiment, is disclosed. The method includes assigning the wire to a first class if a number of interruptions that occurred during the production process is less than or equal to a first value; assigning the wire to a second class if the number of interruptions that occurred during the production process is greater than the first value; and applying indicia to the storage device to indicate which of the first class and the second class the wire belongs.

A method of certifying wire (e.g., copper-plated steel wire) formed by a production process and stored on a storage device (e.g., as a boxed coil), according to one exemplary embodiment, is disclosed. The method includes certifying the wire as interruption free if a number of interruptions that occurred during the production process is equal to 0. In one exemplary embodiment, the production process includes the subsequent transfer of the wire from the storage device to another storage device. The method can include applying indicia to at least one of the initial storage device or the subsequent storage device that indicates the interruption free certification.

A method of pricing wire (e.g., copper-plated steel wire) formed by a production process, according to one exemplary embodiment, is disclosed. The method includes assigning a first price to the wire if a number of interruptions that occurred during the production process is equal to a first value; and assigning a second price to the wire if the number of interruptions that occurred during the production process is equal to a second value, wherein the first value is less than the second value, and wherein the first price is greater than the second price. The method can also include assigning a third price to the wire if the number of interruptions that occurred during the production process is equal to a third value, wherein the second value is less than the third value, and wherein the second price is greater than the third price.

A method of pricing wire (e.g., copper-plated steel wire) formed by a production process, according to one exemplary embodiment, is disclosed. The method includes assigning a first price to the wire if a number of interruptions that occurred during the production process is less than or equal to a first value; and assigning a second price to the wire if the number of interruptions that occurred during the production process is greater than the first value, wherein the first price is greater than the second price.

Numerous aspects of the general inventive concepts will become readily apparent from the following detailed description of exemplary embodiments, from the claims and from the accompanying drawings.

BRIEF DESCRIPTION OF THE DRAWINGS

The general inventive concepts as well as embodiments and advantages thereof are described below in greater detail, by way of example, with reference to the drawings in which.

DETAILED DESCRIPTION

While the general inventive concepts are susceptible of embodiment in many different forms, there are shown in the drawings and will be described herein in detail specific embodiments thereof with the understanding that the present disclosure is to be considered as merely an exemplification of the principles of the general inventive concepts. Accordingly, the general inventive concepts are not intended to be limited to the specific embodiments illustrated herein.

Figure 1:
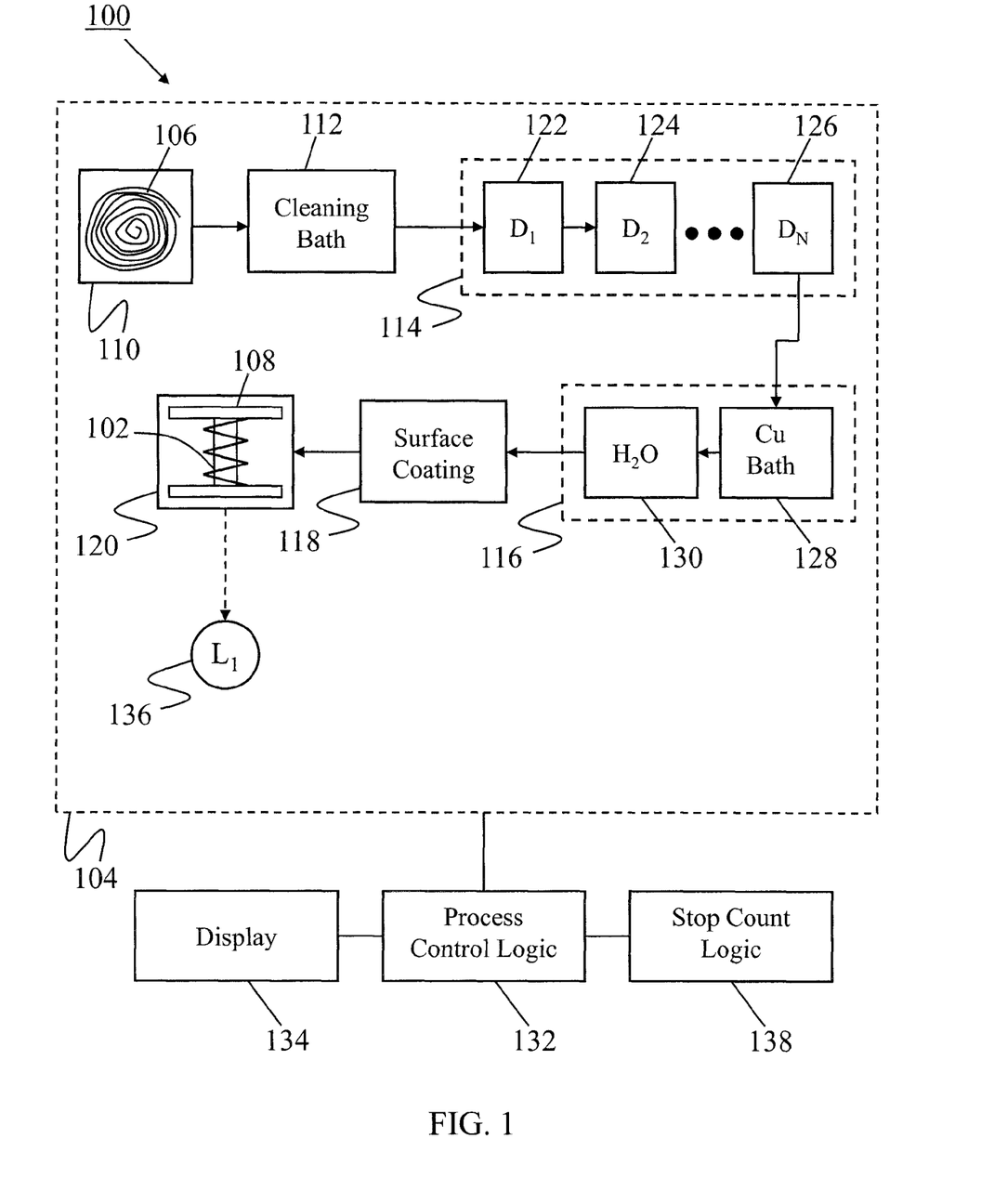
FIG. 1 is a diagram showing a production line for manufacturing wire, according to one exemplary embodiment.

A system 100 for making wire 102, according to one exemplary embodiment, is shown in FIG. 1. The system 100 includes at least one production line 104 for forming the wire 102, such as copper-plated steel wire, from a material 106, such as steel. In one exemplary embodiment, the material 106 is flexible, round steel. Other exemplary materials can include flux cored wire, solid wire, metal cored wire, and non-coated wire. Other suitable materials may be used as needed. The production line 104 includes a series of stations. By moving the material 106 through the stations, the material 106 is transformed into the wire 102 and stored on a storage device 108, such as a reel, drum, stem, or box. Before the material 106 is introduced into the production line 104, it is selected based on characteristics of the material 106 (e.g., its composition) and its suitability for producing a particular (e.g., sized) wire.

In one exemplary embodiment, the production line 104 includes a loading station 110, a cleaning station 112, a drawing station 114, a plating station 116, a coating station 118 and an unloading station 120. More or fewer stations may be used in particular or alternative production lines. For example, the plating station 116 can be omitted from a production line for producing bare wire. Furthermore, the ordering of the stations can change in particular or alternative production lines.

The loading station 110 receives a quantity (e.g., 5000 lb.) of the material 106 for delivery through the production line 104. The material 106 moves from the loading station 110 to the cleaning station 112, where an outer surface of the material 106 is cleaned. In one exemplary embodiment, the cleaning station 112 uses a cleansing and/or coating agent to clean the outer surface of the material 106. After cleaning, the material 106 moves to the drawing station 114.

The drawing station 114 includes at least one die. In one exemplary embodiment, the drawing station 114 includes a series of dies $D_1$ 122, $D_2$ 124, ... $D_N$ 126 (N>1), with each die having a successively smaller opening than the previous die. In one exemplary embodiment, the drawing station 114 includes between 8 and 17 dies. A lubricant (e.g., a powder lubricant) is typically added to the material 106, prior to the material 106 entering each die, to facilitate passage of the material 106 through the dies 122, 124, 126 and to reduce wear on the dies 122, 124, 126. As the material 106 passes through the drawing station 114, a diameter of the material 106 is progressively reduced by plastic deformation to a desired dimension and consequently the length of the material 106 increases. Because of this elongation of the material 106 as it passes through the dies 122, 124, 126, the process speed is faster on the output side of the drawing station 114 than on the input side of the drawing station 114 to accommodate the increased length of the material 106.

As the material 106 leaves the drawing station 114, it optionally moves to the plating station 116 where a layer of copper is deposited on the material 106. In one exemplary embodiment, a thin copper layer is deposited. Application of the copper layer can be continuous or non-continuous.

In one exemplary embodiment, the plating station 116 includes a copper bath 128 housing a copper solution (e.g., copper sulfate, electroless additives, and sulfuric acid) in which the material 106 is submerged. In the copper bath 128, the layer of copper is deposited on the material 106 using an electroless plating process. The plating station 116 also includes a water bath 130 through which the copper-plated material 106 passes to rinse off any excess copper solution. Other techniques, such as electroplating, can be used to deposit the copper layer on the material 106.

The material 106 having the copper plating then moves to a coating station 118 which imparts a surface coating to the material 106 to complete formation of the wire 102. In one exemplary embodiment, the surface coating includes a lubricant. In this case, the lubricious properties of the surface coating facilitate passage of the wire 102 through any liners (e.g., tubes for protecting the wire 102 as it is uncoiled and delivered to a weld site) and/or through a wire-delivery apparatus (e.g., a gun) during welding.

Placement of the copper layer and/or the surface coating on the material 106 provides the resulting wire 102 with properties that are well-suited for use in certain welding applications. From the coating station 118, the wire 102 moves to the unloading station 120 where the wire 102 is wound onto the storage device 108. The storage device 108 can form a final product for sale to and/or use by customers, or the storage device 108 can hold the wire 102 for subsequent processing and/or transferring to another storage device.

The production line 104 also includes process control logic 132. The process control logic 132 is software and/or hardware that controls the production line 104 in accordance with parameters input by an operator. A display 134 is connected to, or otherwise in communication with, the process control logic 132 to provide the operator with an interface for controlling and monitoring the production process.

In preparation for starting the production line 104, the operator or another person manually feeds an end of the material 106 from the loading station 110 through the cleaning station 112, the drawing station 114, the plating station 116, and the coating station 118, and around the storage device 108 at the unloading station 120. Thereafter, during the production process, rotation of the storage device 108 causes the material 106 to be pulled from the loading station 110, through the cleaning station 112, the drawing station 114, the plating station 116, and the coating station 118, to the unloading station 120. Other structure (e.g., rollers, circular blocks) can be used in moving the material 106 through the stations.

The entire production process is automated and ideally continues until a predetermined quantity of the wire 102 is wound on the storage device 108 (hereinafter referred to as a production run). After each production run, the production process is temporarily halted and the wire 102 is manually or automatically cut at a point near the storage device 108. The storage device 108 containing the predetermined quantity of the wire 102 is removed from the production line 104 and can be stored at a location 136 with storage devices 108 from other production runs. The removed storage device 108 is then replaced with an empty storage device 108, and the wire 102 that was previously cut is wrapped around or otherwise engages the empty storage device 108. Thereafter, the production process is restarted and automatic production of the wire 102 resumes.

Exhaustion of the material 106 at the loading station 110 is prevented by joining additional quantities of the material 106 at the loading station 110. For example, additional 4000 lb. coils of steel can be welded together at the loading station 110 to maintain a continuous supply of the material 106 for the production process.

As noted above, ideally, the production process runs continuously except for the routine changing out of full storage devices 108 for empty storage devices 108 between production runs. However, unintended interruptions in the production process are an unavoidable consequence of its high-speed operation. An interruption is any significant change (e.g., reduction) in the respective speeds of the production process during a production run. In one exemplary embodiment, a production run is considered to have commenced once the storage device 108 has rotated for a predetermined period of time, which accounts for the period of time it takes for the production line 104 to transition from an initial idle state to normal process speeds during each production run. In one exemplary embodiment, an interruption means the production process comes to a complete stop. The interruption can result from the operator halting the production process, for example, when a problem in the production process is observed. When an unintended interruption in the production process occurs, the resulting abrupt reduction in the process speed can cause the material 106 to deform, break and/or have significant coating variances, all of which can have a negative impact on the performance of the resulting wire 102 during welding.

For example, an uninterrupted production run results in the wire 102 having generally uniform cast, pitch, and twist properties throughout the predetermined quantity of the wire 102. If the wire 102 is extended, the tendency of the wire 102 is to assume a circular or sinusoidal shape. Cast refers to an amplitude of the wire 102. Pitch refers to a distance the wire 102 rises or lifts from a flat surface. Twist refers to a number of turns or revolutions that the wire 102 has when held at its ends. The cast, pitch, and twist properties of the wire 102 are controlled or otherwise influenced within the production process, such that the wire 102 will exhibit a consistent and/or desired behavior.

Figure 3:
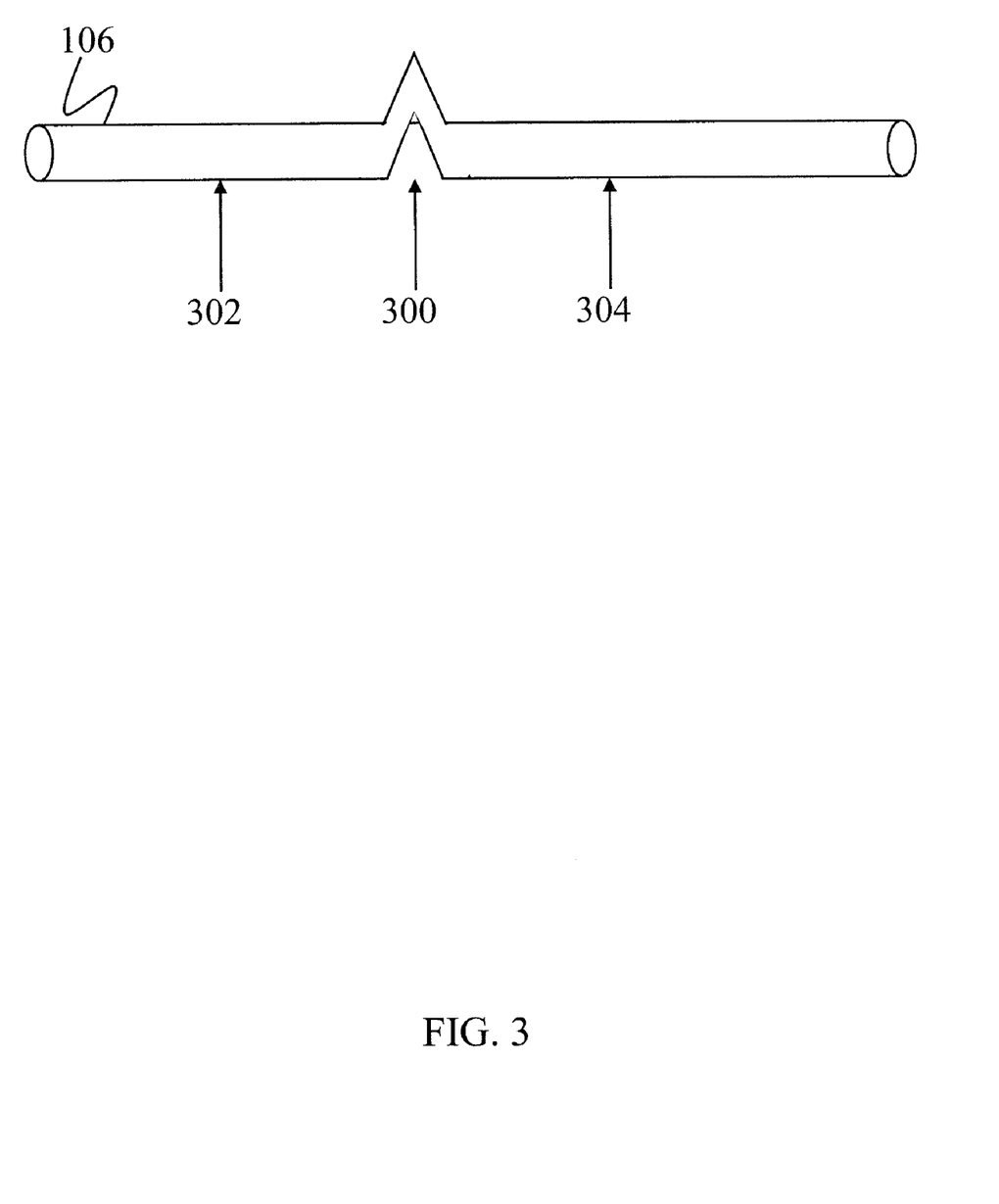
FIG. 3 is a drawing that shows a wire having a deformed portion, according to one exemplary embodiment.

If any interruptions occur during a production run, however, the resulting wire 102 cannot be assured of having generally uniform cast, pitch, and twist properties. For example, interruptions during the production process can result in the material 106 being deformed, such that a deformed portion 300 results between a non-deformed first portion 302 and a non-deformed second portion 304, as shown in FIG. 3. If the deformed portion 300 is not removed during the production process, the resulting wire 102 will include the deformed portion 300, which contributes to a reduction in the uniformity of the cast, pitch, and twist properties of the wire 102. This reduction in the uniformity of the cast, pitch, and twist properties of the wire 102 can have a negative impact on the quality of the wire 102. For example, as the uniformity of the cast, pitch, and twist properties of the wire 102 are reduced, the wire 102 may become more difficult to store (e.g., on the storage device 108) in a consistent manner.

Figure 4:
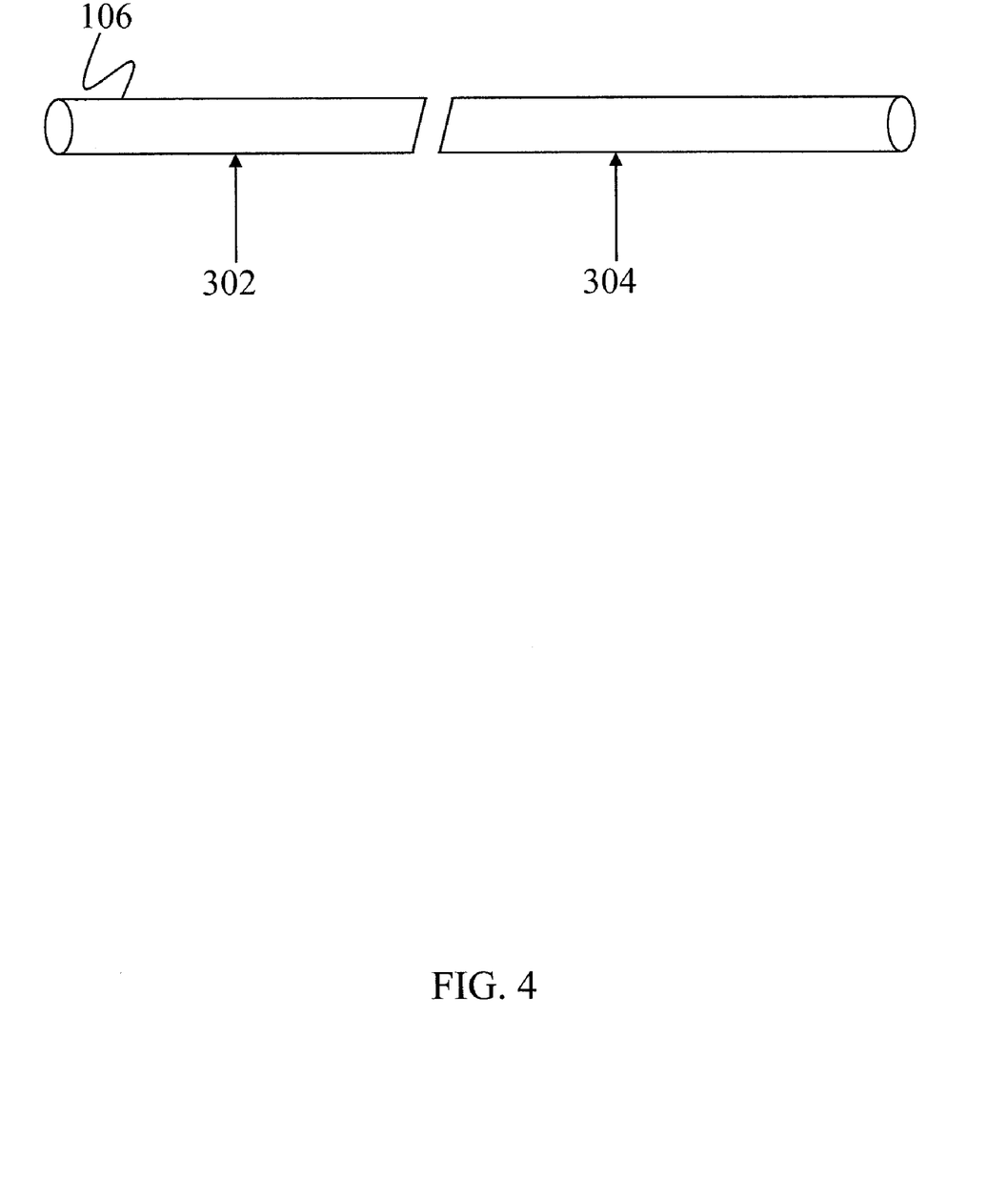
FIG. 4 is a drawing that shows a wire having a break, according to one exemplary embodiment.
Figure 5:
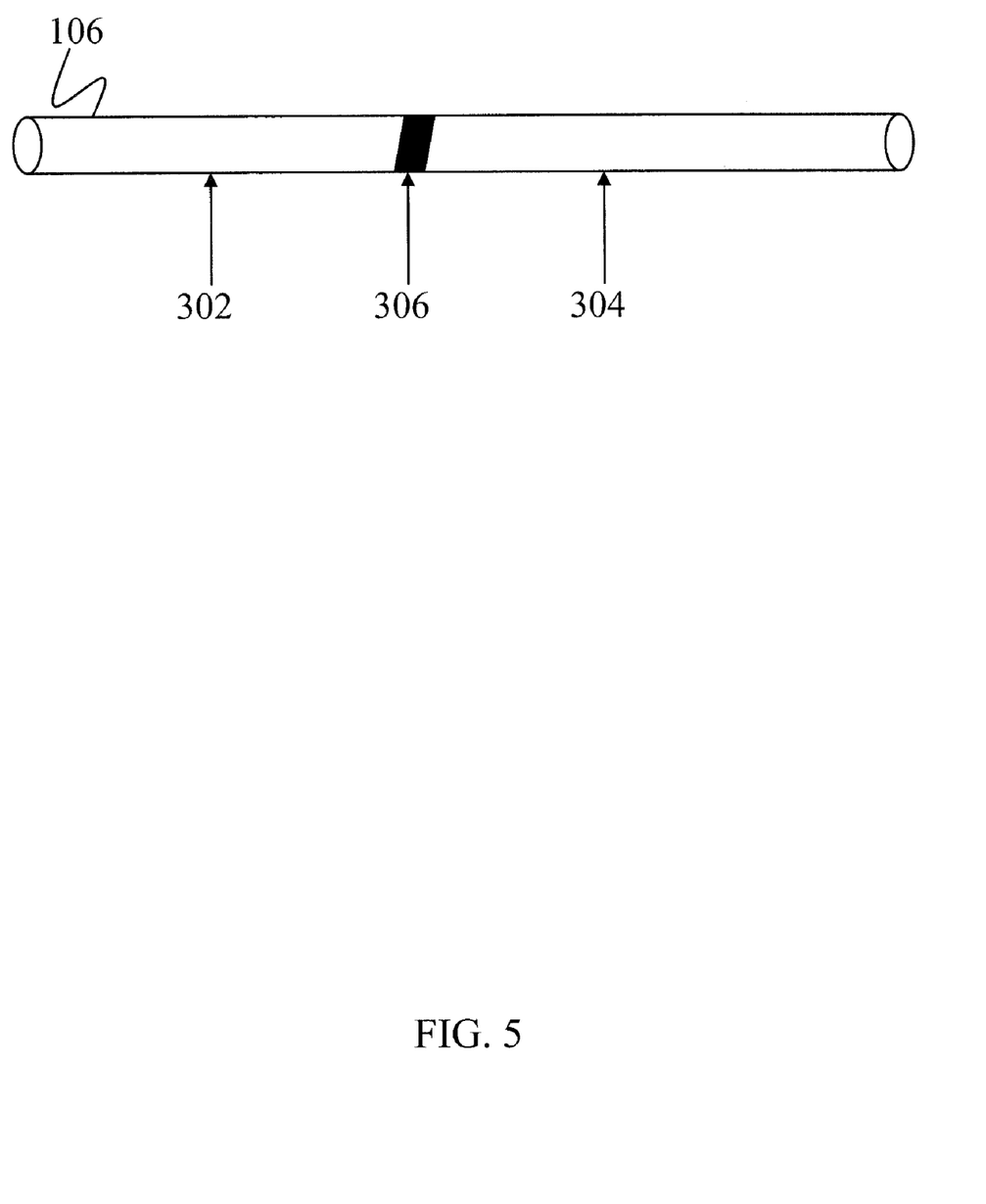
FIG. 5 is a drawing that shows a wire having a welded portion, according to one exemplary embodiment.

Furthermore, if substantial, the deformed portion 300 may need to be removed before the production process can resume in a normal fashion. The deformed portion 300 is typically removed (e.g., manually cut out) such that the material 106 separates into the non-deformed first portion 302 and the non-deformed second portion 304, as shown in FIG. 4. The first portion 302 and the second portion 304 of the material 106 must be reconnected so that the production process can be restarted. Typically, the first portion 302 and the second portion 304 are joined by a weld 306, as shown in FIG. 5. The weld 306 can reduce the uniformity of the cast, pitch, and twist properties of the wire 102

Similarly, if the material 106 breaks during the production process, the material 106 separates into the first portion 302 and the second portion 304, as shown in FIG. 4. In this case, the first portion 302 and the second portion 304 of the material 106 must be reconnected before the production process can resume. As noted above, the first portion 302 and the second portion 304 are typically joined by the weld 306, as shown in FIG. 5. The weld 306 can reduce the uniformity of the cast, pitch, and twist properties of the wire 102.

Unintended interruptions during the production process can also result in the wire 102 having coating variances. When an unintended interruption occurs, the production process often slows abruptly and/or comes to a stop. As a result, application of the copper plating via the plating station 116 and application of the surface coating via the coating station 118 occur at a different rate than when the production process is operating at its normal speeds. Thus, the interruptions cause the copper plating and the surface coating to be applied in a non-uniform manner.

Each deformed portion 300, weld 306 and/or variation in copper plating or surface coating represents a potential inconsistency in the wire 102 that can have a negative impact on the performance of the wire 102 during welding. The aforementioned unintended interruptions in the production process represent the underlying cause of these inconsistencies. The system 100 is capable of tracking a number of interruptions that occur during each production run. Accordingly, the system 100 can identify a corresponding number of inconsistencies that likely exists in a predetermined quantity of the wire 102.

In particular, the system 100 includes stop count logic 138. In one exemplary embodiment, the stop count logic 138 is integrated with the process control logic 132. The stop count logic 138 is software and/or hardware that operates to identify the number of interruptions occurring during a particular production run (hereinafter referred to as production interruptions). The stop count logic 138 can monitor (e.g., by interfacing with the process control logic 132) any equipment and/or parameters relating to the production process to determine whether an interruption has occurred. For example, the stop count logic 138 can measure a rotational speed of a storage device 108 during a production run. In this case, the stop count logic 138 determines that an interruption has occurred each time a significant change in the rotational speed of the storage device 108 is detected during the production run. As another example, the stop count logic 138 can monitor a state of a process motor or obtain such state information from the process control logic 132. In this case, the stop count logic 138 determines that an interruption has occurred each time a significant change in the state of the process motor is detected during the production run. Other examples of equipment and/or parameters relating to the production process that can be monitored by the stop count logic 138 include loose tension in rollers, faults in winding traverse, faults due to excess torque, and/or status (e.g., open or closed) of any guard interlocks.

The stop count logic 138 also operates to associate the number of interruptions with the storage device 108 for the particular production run. Thus, each storage device 108 can be marked with the number of interruptions that occurred during production of the wire 102 stored thereon. Since the number of production interruptions is an indicator of the number of inconsistencies likely to exist in the wire 102, the number of production interruptions can be used as a quality metric for differentiating different production runs of the wire 102.

Figure 6:
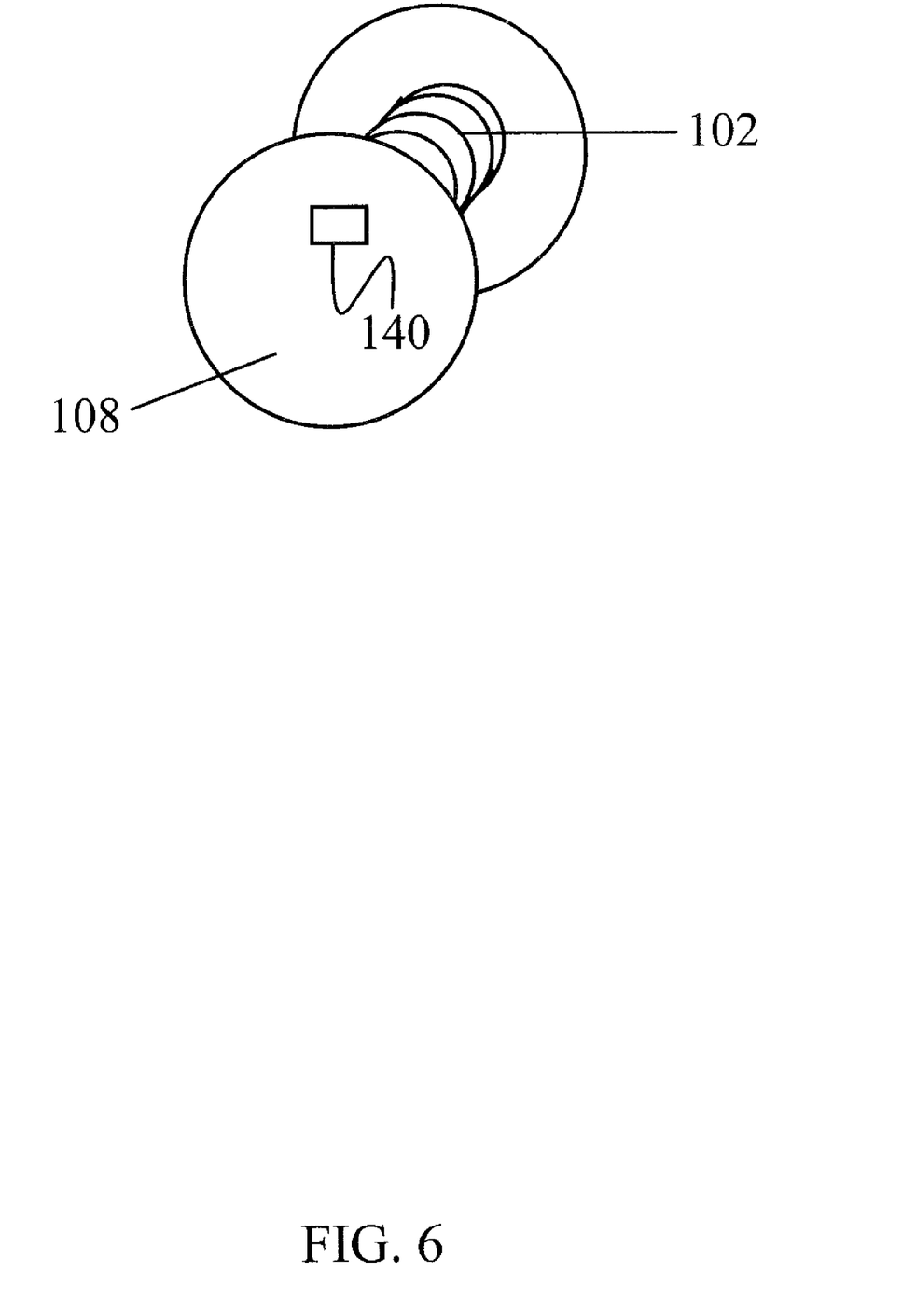
FIG. 6 is a drawing that shows a reel of wire associated with a number of production-related interruptions, according to one exemplary embodiment.

In one exemplary embodiment, the storage device 108 is marked by affixing a label 140 to the storage device 108 indicating the number of production interruptions, as shown in FIG. 6. The label 140 can be affixed while the storage device 108 is at the unloading station 120, the location 136 or elsewhere. The label 140 can be affixed manually or automatically. In one exemplary embodiment, the storage device 108 has identifying information (e.g., a reel number) indicated thereon or attached thereto (e.g., an RFID tag) and the number of production interruptions is associated with the storage device 108 by mapping the identifying information and the number of production interruptions to a data store, for example, a database (not shown).

In one exemplary embodiment, instead of or in addition to marking the storage device 108 with the number of production interruptions, the storage device 108 is grouped based on its associated number of production interruptions. For example, the storage device 108 can be segregated to a predetermined location (e.g., the location 136) for subsequent processing based on its number of production interruptions. The predetermined location is designated for those storage devices 108 associated with a specific number of production interruptions or range of production interruptions (e.g., less than some predetermined threshold). In one exemplary embodiment, only those storage devices 108 having zero production interruptions associated therewith are placed at the predetermined location. In addition to the number of production interruptions, the storage device 108 can be grouped based on one or more properties (e.g., size, cast, coating, pitch, twist) of the wire 102 stored on the storage device 108.

In one exemplary embodiment, the stop count logic 138 identifies how much wire 102 (e.g., by weight, by length) was produced when an interruption occurs, thereby allowing a location of a corresponding inconsistency in the wire 102 to be identified or otherwise approximated. Based on the estimated location of the inconsistency, the system 100 and/or its operator can determine whether the inconsistency occurred in a portion of the wire 102 that is readily removable (e.g., near the end of a production run, near where the wire 102 is expected to be partitioned into smaller quantities). If so, the system 100 and/or its operator can remove the portion of the wire 102 with the inconsistency, thereby increasing the overall consistency of the remaining wire 102.

In producing the wire 102, it is often desirable to transfer the predetermined quantity (e.g., 4000 lbs.) of wire 102 from the storage device 108 to one or more packages 202 (e.g., 1000 lb. packaged coils of the wire 102) for sale to and/or use by customers. Accordingly, in one exemplary embodiment, a system 200 for transferring the wire 102 is provided (see FIG. 2). The system 200 has at least one transfer line 204. Each transfer line 204 includes a loading station 206, a transfer station 208 and an unloading station 210. More or fewer stations may be used in particular or alternative transfer lines. Furthermore, the ordering of the stations can change in particular or alternative transfer lines.

Figure 2:
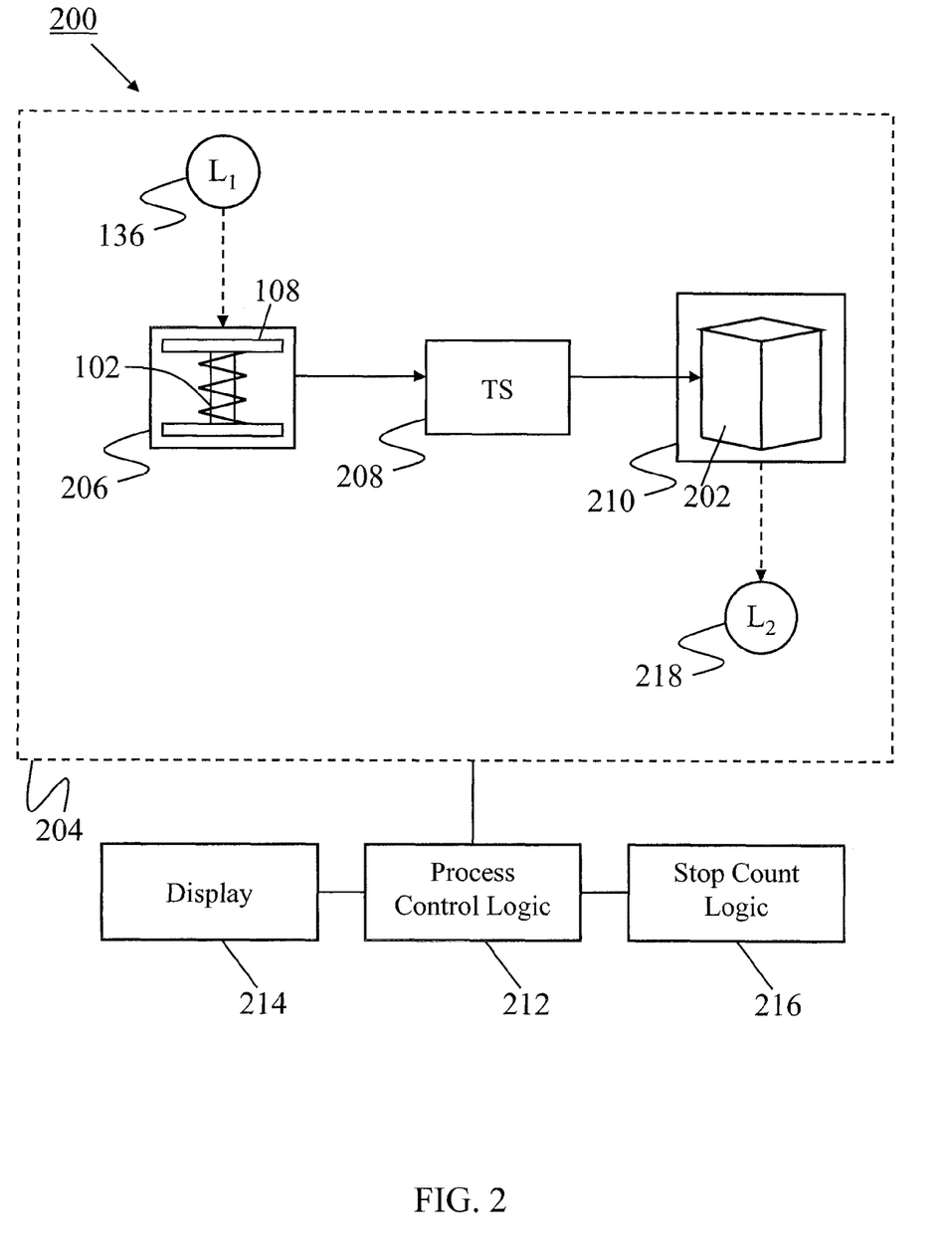
FIG. 2 is a diagram showing a transfer line for transferring wire from a first storage device to a second storage device, according to one exemplary embodiment.

In one exemplary embodiment, the system 200 is separate from the system 100 and includes its own process control logic 212, display 214 and stop count logic 216, as shown in FIG. 2. Alternatively, the system 200 could be integral with the system 100, such that the loading station 206, transfer station 208 and unloading station 210 are included in the production line 104 and controlled by the process control logic 132, display 134 and stop count logic 138 of the system 100.

The loading station 206 receives the storage device 108 with the wire 102. For example, the storage device 108 is moved from the location 136 to the loading station 206 of the transfer line 204. An operator or other person manually feeds an end of the wire 102 from the storage device 108 at the loading station 206, through the transfer station 208 and to the package 202 or related structure at the unloading station 210. Thereafter, during the transfer process, rotation of the package 202 or related structure causes the wire 102 to be pulled from the storage device 108 and wound in the package 202. In one exemplary embodiment, the transfer station 208 operates to ensure that the wire 102 is unwound from the storage device 108 and wound into the package 202 in a consistent manner.

The entire transfer process is automated and ideally continues until a predetermined quantity of the wire 102 is wound in the package 202 (hereinafter referred to as a transfer run). The transfer process is temporarily halted after each transfer run and the wire 102 is manually or automatically cut at a point near or in the package 202. The package 202 containing the predetermined quantity of the wire 102 is removed from the unloading station 210 and can be stored at a location 218 with packages 202 from other transfer runs. The removed package 202 is then replaced with an empty package 202, and the wire 102 that was previously cut is wrapped around or otherwise engages the empty package 202 or related structure. Thereafter, the transfer process is restarted and automatic transfer of the wire 102 from the storage device 108 to the package 202 commences. The storage device 108 may contain enough wire 102 to fill several of the packages 202. When the storage device 108 runs out of the wire 102, it can be replaced at the loading station 210 with another storage device 108 having the predetermined quantity of the wire 102.

As noted above, ideally, the transfer process runs continuously during each transfer run, with the routine changing out of full packages 202 for empty packages 202 between transfer runs and, as needed, empty storage devices 108 for full storage devices 108. However, unintended interruptions in the transfer process are an unavoidable consequence of its high-speed operation. An interruption is any significant change (e.g., reduction) in the speed of the transfer process during a transfer run. In one exemplary embodiment, a transfer run is considered to have commenced once the package 202 or related structure has rotated for a predetermined period of time, which accounts for the period of time it takes for the transfer line 204 to transition from an initial idle state to a normal process speed during each transfer run. In one exemplary embodiment, an interruption means the transfer process comes to a complete stop. The interruption can result from the operator halting the transfer process, for example, when a problem in the transfer process is observed. When an unintended interruption in the transfer process occurs, the resulting abrupt reduction in the process speed can cause the wire 102 to deform or break, as described above, which can have a negative impact on the performance of the wire 102 during welding.

If the wire 102 deforms substantially or breaks, it may need to be fixed with the weld 306, as shown in FIG. 5. Each deformed portion 300 and/or weld 306 can reduce the general uniformity of the cast, pitch, and twist properties of the wire 102. Additionally, each deformed portion 300 and/or weld 306 represents a potential inconsistency in the wire 102 that can have a negative impact on the performance of the wire 102 during welding. Unintended interruptions in the transfer process represent the underlying cause of these inconsistencies. The system 200 is capable of tracking a number of interruptions that occur during each transfer run. Accordingly, the system 200 can identify a corresponding number of inconsistencies that likely exists in a predetermined quantity of the wire 102.

In particular, the system 200 includes the stop count logic 216, which is software and/or hardware that operates to identify the number of interruptions occurring during a particular transfer run (hereinafter referred to as transfer interruptions). The stop count logic 216 can monitor (e.g., by interfacing with the process control logic 212) any equipment and/or parameters relating to the transfer process to determine whether an interruption has occurred. For example, the stop count logic 216 can measure a rotational speed of a package 202 or related structure during a transfer run. In this case, the stop count logic 216 determines that an interruption has occurred each time a significant change in the rotational speed of the package 202 or related structure is detected during the transfer run. As another example, the stop count logic 216 can monitor a state of a process motor or obtain such state information from the process control logic 212. In this case, the stop count logic 216 determines that an interruption has occurred each time a significant change in the state of the process motor is detected during the production run. In one exemplary embodiment, the stop count logic 216 is integrated with the process control logic 212.

The stop count logic 216 also operates to associate the number of interruptions with the package 202 for the particular transfer run. Thus, each package 202 can be marked with the number of interruptions that occurred during transfer of the wire 102 from the storage device 108 to the package 202. Since the number of transfer interruptions is an indicator of the number of inconsistencies likely to exist in the wire 102, the number of transfer interruptions can be used as a quality metric for differentiating different transfer runs of the wire 102.

Figure 7:
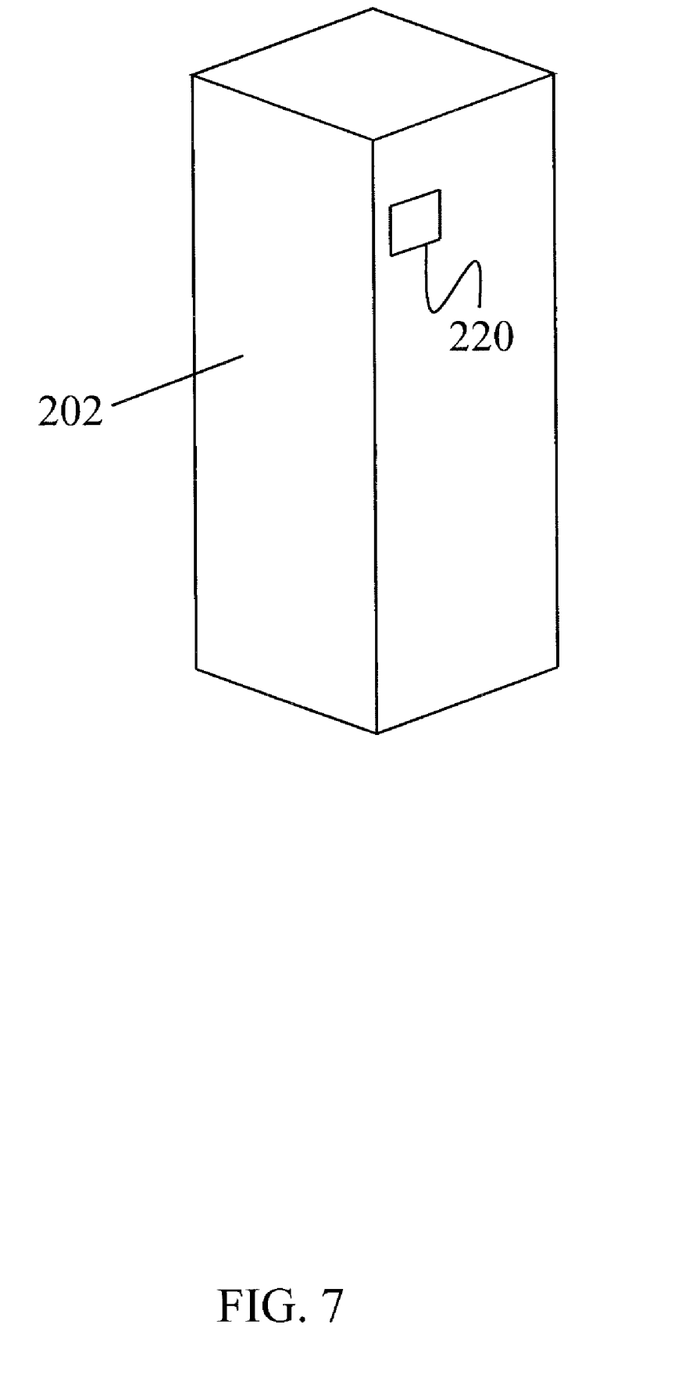
FIG. 7 is a drawing that shows a package of wire associated with a number of production-related and/or transfer-related interruptions, according to one exemplary embodiment.

In one exemplary embodiment, the package 202 is marked by affixing a label 220 to the package 202 indicating the number of transfer interruptions, as shown in FIG. 7. The label 220 can be affixed while the package 202 is at the unloading station 210, the location 218 or elsewhere. The label 220 can be affixed manually or automatically. In one exemplary embodiment, the package 202 has identifying information (e.g., a package number) indicated thereon or attached thereto (e.g., an RFID tag) and the number of transfer interruptions is associated with the package 202 by mapping the identifying information and the number of transfer interruptions to a data store, for example, a database (not shown).

In one exemplary embodiment, instead of or in addition to marking the package 202 with the number of transfer interruptions, the package 202 is grouped based on its associated number of transfer interruptions. For example, the package 202 can be segregated to a predetermined location (e.g., the location 218) for subsequent processing based on its number of transfer interruptions. The predetermined location is designated for those packages 202 associated with a specific number of transfer interruptions or range of transfer interruptions (e.g., less than some predetermined threshold). In one exemplary embodiment, only those packages 202 having zero transfer interruptions associated therewith are placed at the predetermined location. In addition to the number of transfer interruptions, the package 202 can be grouped based on one or more properties (e.g., size, cast, coating, pitch, twist) of the wire 102 in the package 202.

In one exemplary embodiment, the stop count logic 216 identifies how much wire 102 (e.g., by weight, by length) was transferred when an interruption occurs, thereby allowing a location of a corresponding inconsistency in the wire 102 to be identified or otherwise approximated. Based on the estimated location of the inconsistency, the system 200 and/or its operator can determine whether the inconsistency occurs in a portion of the wire 102 that is readily removable (e.g., near the beginning or end of a transfer run). If so, the system 200 and/or its operator can remove the portion of the wire 102 with the inconsistency, thereby increasing the overall consistency of the remaining wire 102.

In one exemplary embodiment, the stop count logic 138 of the system 100 is in communication (e.g., via wired or wireless communication) with the stop count logic 216 of the system 200. Accordingly, the number (and location) of interruptions for the wire 102 on a storage device 108 from a production run can be sent from the stop count logic 138 to the stop count logic 216, where the stop count logic 216 can determine a total number of interruptions encountered by the wire 102 in the package 202, as the sum of the number of interruptions during the production run of the wire 102 (i.e., the production interruptions) and the number of interruptions during the transfer run of the wire 102 (i.e., the transfer interruptions). Thus, the label 220 on the package 202 can indicate the total number of interruptions encountered by the wire 102 during its production and transfer runs.

Figure 8:
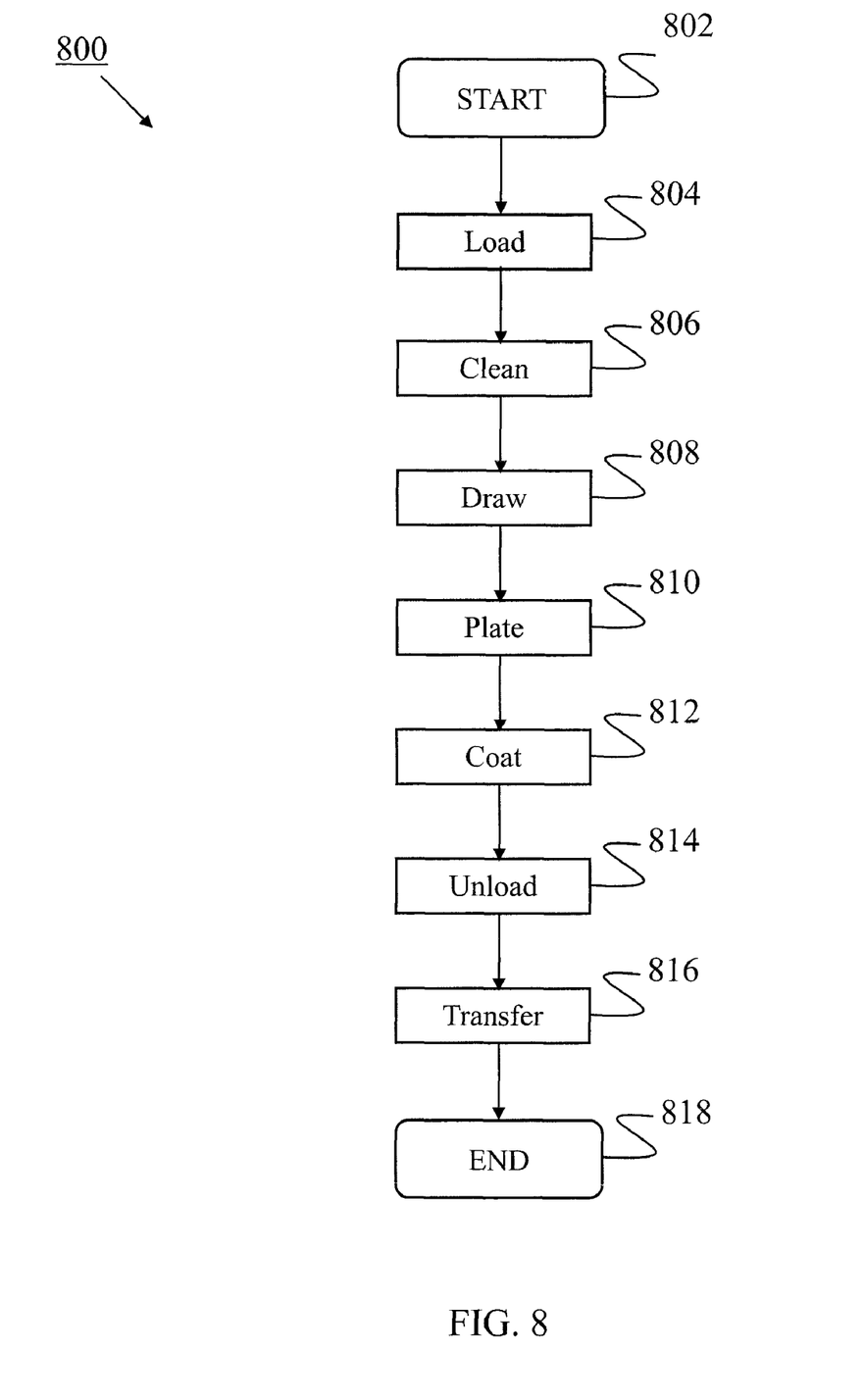
FIG. 8 is a flowchart showing a method of manufacturing and transferring wire, according to one exemplary embodiment.

A method 800 of making wire (e.g., the wire 102), according to one exemplary embodiment, is shown in FIG. 8. The method 800 begins with the loading of a material (e.g., the material 106) from which the wire is to be formed in step 804. The material, such as a 4000 lb. coil of steel, is selected based on initial characteristics (e.g., diameter, composition) of the material that render it suitable for forming the wire. In one exemplary embodiment, loading the material includes moving the material from a storage location to a production location or line.

After loading, the material is cleaned in step 806. In one exemplary embodiment, an outer surface of the material is cleaned by application of a cleansing and/or coating agent. The cleaning removes dirt and debris from the outer surface of the material. The cleaning can also be used to remove paint or other marking that was put on the outer surface of a portion of the material to provide visual indicia of one or more of the aforementioned initial characteristics of the material.

After the material is cleaned, the material is drawn through at least one die in step 808. In one exemplary embodiment, the material is drawn through a series of two or more dies in step 808. Because each die has a successively smaller opening than the previous die, a diameter of the material is progressively reduced by plastic deformation to a desired dimension. A lubricant (e.g., a powder lubricant) is typically applied to the material before it enters each of the dies, to facilitate passage of the material through the dies and to reduce wear on the dies.

After the material is drawn to the desired diameter, a layer of copper is deposited on the material in step 810. In one exemplary embodiment, the layer of copper is deposited on the material by an electroless plating process. Other techniques, such as electroplating, can be used to deposit the copper on the material.

A surface coating is then applied over the copper layer in step 812. In one exemplary embodiment, the surface coating includes a lubricant. In this case, the lubricious properties of the surface coating facilitate passage of the wire through any liners (e.g., tubes for protecting the wire as it is uncoiled and delivered to a weld site) and/or through a wire-delivery apparatus (e.g., a gun) during welding.

After application of the surface coating, the wire is unloaded onto a first storage device in step 814. In one exemplary embodiment, the first storage device is a reel on which a first predetermined quantity (e.g., 4000 lbs.) of the wire is wound. The first storage device can be a final product for sale to and/or use by customers, or the first storage device can hold the wire for subsequent processing and/or transferring to another storage device.

Once the first predetermined quantity of the wire is unloaded onto the first storage device, the first storage device is removed and replaced with a new first storage device that is empty. Thereafter, steps 804, 806, 808, 810, 812 and 814 can be repeated until the first predetermined quantity of the wire is unloaded onto the new first storage device.

To prevent exhaustion of the material, as the method 800 is repeated, the material can be continuously loaded in step 804. For example, quantities of the material are appended to one another, as needed, to provide a continuous supply of the material. In one exemplary embodiment, as one 4000 lb. coil of steel is used up, another 4000 lb. coil of steel is welded thereto.

Subsequent processing of the wire may occur after the first predetermined quantity of the wire is placed on the first storage device. For example, a second predetermined quantity of the wire can be transferred from the first storage device to a second storage device in step 816. The second storage device is a package that is well suited for sale to and/or use by a customer. The transfer of the wire from the first storage device to the second storage device is achieved by unwinding the second predetermined quantity of the wire from the first storage device and rewinding it onto the second storage device. In one exemplary embodiment, the second predetermined quantity is less than the first predetermined quantity. In one exemplary embodiment, the first predetermined quantity is an integer multiple of the second predetermined quantity.

Steps 804, 806, 808, 810, 812 and 814 correspond to a production process and ideally occur continuously until the first predetermined quantity of the wire is formed and placed on the first storage device. Step 816 corresponds to a transfer process and ideally occurs continuously until the second predetermined quantity of the wire is transferred from the first storage device to the second storage device. As noted above, interruptions in the production process and/or the transfer process can have a negative impact on the performance of the resulting wire 102 during welding. Accordingly, the method 800 includes tracking a number of interruptions that occur during the production process and/or the transfer process. For example, the method 800 includes tracking the number of interruptions that occur during one of or any combination of two or more of the steps 804, 806, 808, 810, 812, 814, and 816. An interruption is any significant change (e.g., reduction) in the normal speeds of the production process and/or the transfer process. In one exemplary embodiment, an interruption means the production and/or transfer process comes to a complete stop.

More or fewer steps may be present in particular or alternative methods of making the wire. For example, the plating in step 810 can be omitted if bare wire is being produced. Furthermore, the order in which the steps are performed can change in particular or alternative methods.

Figure 9:
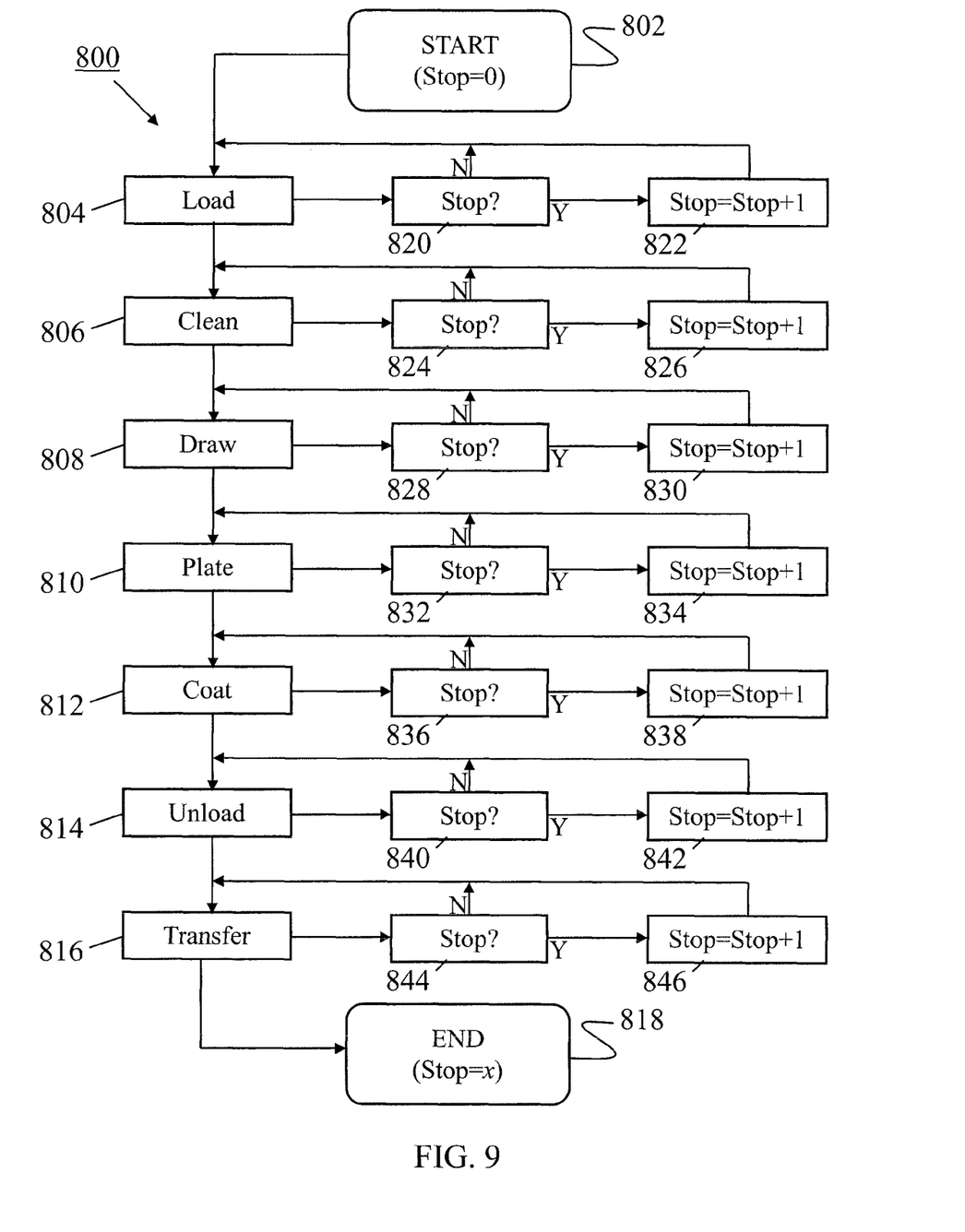
FIG. 9 is a flowchart showing logic for counting a number of stops, according to one exemplary embodiment, during the production and subsequent transfer of wire in the method of FIG. 8.

In one exemplary embodiment, as shown in FIG. 9, the method 800 tracks those interruptions that result in the production process or the transfer process coming to a stop. At that start of the method 800, a counter (e.g., a global variable "Stop") for tracking the number of stops is set to have a value of zero in step 802. After the production process commences, the method 800 continually checks, in step 820, whether or not a stop has occurred during the loading of the material. If a stop has not occurred, then loading of the material continues in step 804. If a stop has occurred, the counter is incremented by 1 in step 822. Thereafter, the loading of the material in step 804 can resume after the cause of the stop is addressed.

The method 800 continually checks, in step 824, whether or not a stop has occurred during the cleaning of the material. If a stop has not occurred, then cleaning of the material continues in step 806. If a stop has occurred, the counter is incremented by 1 in step 826. Thereafter, the cleaning of the material in step 806 can resume after the cause of the stop is addressed.

The method 800 continually checks, in step 828, whether or not a stop has occurred during the drawing of the material through the dies. If a stop has not occurred, then drawing of the material continues in step 808. If a stop has occurred, the counter is incremented by 1 in step 830. Thereafter, the drawing of the material in step 808 can resume after the cause of the stop is addressed.

The method 800 continually checks, in step 832, whether or not a stop has occurred during the plating of the material with the copper. If a stop has not occurred, then plating of the material continues in step 810. If a stop has occurred, the counter is incremented by 1 in step 834. Thereafter, the plating of the material in step 810 can resume after the cause of the stop is addressed.

The method 800 continually checks, in step 836, whether or not a stop has occurred during the coating of the material with the surface coating. If a stop has not occurred, then coating of the material continues in step 812. If a stop has occurred, the counter is incremented by 1 in step 838. Thereafter, the coating of the material in step 812 can resume after the cause of the stop is addressed.

The method 800 continually checks, in step 840, whether or not a stop has occurred during the unloading of the completed wire onto the first storage device. If a stop has not occurred, then unloading of the wire continues in step 814. If a stop has occurred, the counter is incremented by 1 in step 842. Thereafter, the unloading of the wire in step 814 can resume after the cause of the stop is addressed.

The unloading of the wire continues until the first predetermined quantity of the wire is stored on the first storage device. At this time, the value of the counter indicates the number of stops that occurred during the production process.

If the second predetermined quantity of the wire is subsequently transferred from the first storage device to the second storage device in step 816, the method continually checks, in step 844, whether or not a stop has occurred during the transfer of the wire onto the second storage device, after the transfer process commences. If a stop has not occurred, then transfer of the wire continues in step 816. If a stop has occurred, the counter is incremented by 1 in step 846. Thereafter, the transfer of the wire in step 816 can resume after the cause of the stop is addressed.

The transfer of the wire continues until the second predetermined quantity of the wire is stored in or on the second storage device. At this time, the value of the counter indicates the number of stops that occurred during the production and transfer processes.

In view of the above exemplary embodiments and consistent with the general inventive concepts, the wire 102 (e.g., in packages 202) can be differentiated based on the number of unintended interruptions that occurred during the production and/or transfer (e.g., packaging) of the wire 102. For example, wire 102 that encountered no interruptions during its production and/or transfer can be generally classified as higher quality wire (e.g., having more uniformity) than wire 102 that encountered a few interruptions during its production and/or transfer. Likewise, wire 102 that encountered a few interruptions can be generally classified as higher quality wire than wire 102 that encountered many interruptions. In addition to the number of production and/or transfer interruptions, the wire 102 can be differentiated based on one or more properties (e.g., size, cast, pitch, twist) of the wire 102.

The ability to classify the wire 102 based in whole or in part on characteristics (e.g., the number of interruptions encountered by the wire 102) that are indicative of the quality of the wire 102 and that are unknown until after the production and/or transfer of the wire 102 is complete, provides increased flexibility in differentiating the wire 102 across different production runs and/or transfer runs, different production lines and/or transfer lines, different manufacturers, etc. For example, a first package 202 of the wire 102 and a second package 202 of the wire 102 might have previously been considered the same or otherwise interchangeable because of similarities in the characteristics (e.g., diameter, composition) of the wire 102 in the first and second packages 202. However, if the wire 102 in the first package 202 encountered ten interruptions during its production and packaging, but the wire 102 in the second package 202 encountered only one interruption during its production and packaging, the wire 102 in the second package 202 is of a higher quality than the wire 102 in the first package 202.

Thus, the number of interruptions can be used to differentiate each package 202 of the wire 102 into one or more distinct classes. As one example of a classification scheme, if the total number of interruptions associated with the package 202 of wire 102 is zero, the wire 102 in the package 202 is classified as zero-stop or no-stop wire; if the total number of interruptions associated with the package 202 of wire 102 is one, the wire 102 in the package 202 is classified as one-stop wire; and so on. As another example of a classification scheme, if the total number of interruptions associated with the package 202 of wire 102 is zero, the wire 102 in the package 202 is classified as premium grade wire; if the total number of interruptions associated with the package 202 of wire 102 is one to two, the wire 102 in the package 202 is classified as high grade wire; if the total number of interruptions associated with the package 202 of wire 102 is three to five, the wire 102 in the package 202 is classified as standard grade wire; and if the total number of interruptions associated with the package 202 of wire 102 is more than five, the wire 102 in the package 202 is classified as low grade wire.

The ability to differentiate the wire 102 based on the number of interruptions encountered during the production and/or transfer of the wire 102 can be used to certify that a particular quantity of the wire 102 is interruption free, i.e., did not encounter any interruptions. The certification, for example, can take the form of indicia attached to or otherwise associated with the storage device. As a result, customers and/or users of the wire 102 can be confident that the quality of the wire 102 was not impacted by one or more interruptions during the production and/or transfer of the wire 102.

The ability to differentiate the wire 102 based on the number of interruptions encountered during the production and/or transfer of the wire 102 can also be used as a pricing metric. Since the number of interruptions is indicative of the quality of the wire 102, the number of interruptions associated with a package 202 of the wire 102 can be taken into account when setting a price point at which the package 202 will be marketed and sold.

The ability to differentiate the wire 102 based on the number of interruptions encountered during the production and/or transfer of the wire 102 allows the wire 102 to be better targeted to specific applications. For example, a first welding project might call for a highly consistent wire 102 having uniformity in cast, pitch, and twist properties throughout, wherein a wire 102 that encountered few, if any, interruptions during its production and/or transfer should be used. Conversely, a wire 102 that encountered several interruptions during its production and/or transfer and, thus, has less uniformity, may be sufficient for a second welding project.

The ability to differentiate the wire 102 based on the number of interruptions encountered during the production and/or transfer of the wire 102 can also be used as a quality control mechanism. For example, if the stop control logic 138 of the system 100 determines that the number of interruptions for the storage device 108 of wire 102 exceeds a predetermined threshold value, the production run can be aborted or the storage device 108 or wire 102 rejected. Likewise, if the stop control logic 216 of the system 200 determines that the number of interruptions for the package 202 of wire 102 exceeds a predetermined threshold value, the transfer run can be aborted or the package 202 of wire 102 rejected.

The above description of specific embodiments has been given by way of example. From the disclosure given, those skilled in the art will not only understand the general inventive concepts and attendant advantages, but will also find apparent various changes and modifications to the structures and methods disclosed. For example, a production run might involve multiple drawing processes, wherein a material is drawn through multiple drawing stations to form wire. It is sought, therefore, to cover all such changes and modifications as fall within the spirit and scope of the general inventive concepts, as defined by the appended claims, and equivalents thereof.

What is claimed is:

1. A method of classifying a quantity of wire formed by a production process and stored on a storage device, wherein said production process includes at least one of loading a first material for producing the wire, cleaning the first material, drawing the first material through at least one die, plating the first material with a second material, and applying a surface coating to at least one of the first and second material, the method comprising:
   assigning the wire to a first class if a number of interruptions that occurred during the production process is equal to a first value;
   assigning the wire to a second class if the number of interruptions that occurred during the production process is equal to a second value; and
   applying indicia to the storage device to indicate which of the first class and the second class the wire belongs, wherein the first value and the second value are different,
   wherein each interruption corresponds to an unintended change in a speed of the production process.

2. The method of claim 1, wherein the first value is 0.

3. The method of claim 1, wherein the production process includes a step of loading the first material for producing the wire.

4. The method of claim 3, wherein the production process includes a step of cleaning the first material.

5. The method of claim 3, wherein the production process includes a step of drawing the first material through the at least one die.

6. The method of claim 3, wherein the production process includes a step of transferring the wire to the storage device.

7. The method of claim 3, wherein the production process includes a step of plating the first material with a the second material.

8. The method of claim 7, wherein the second material is electrically conductive.

9. The method of claim 3, wherein the production process includes a step of applying the surface coating to the at least one of the first and second material.

10. The method of claim 9, wherein the surface coating includes a lubricant.

11. A method of classifying a quantity of wire formed by a production process and stored on a storage device, wherein said production process includes at least one of loading a first material for producing the wire, cleaning the first material, drawing the first material through at least one die, plating the first material with a second material, and applying a surface coating to at least one of the first and second material, the method comprising:
   assigning the wire to a first class if a number of interruptions that occurred during the production process is less than or equal to a first value;
   assigning the wire to a second class if the number of interruptions that occurred during the production process is greater than the first value; and
   applying indicia to the storage device to indicate which of the first class and the second class the wire belongs,
   wherein each interruption corresponds to an unintended change in a speed of the production process.

12. The method of claim 11, wherein the first value is 0.

13. The method of claim 11, wherein the production process includes a step of loading the first material for producing the wire.

14. The method of claim 13, wherein the production process includes a step of cleaning the first material.

15. The method of claim 13, wherein the production process includes a step of drawing the first material through the at least one die.

16. The method of claim 13, wherein the production process includes a step of transferring the wire to the storage device.

17. The method of claim 13, wherein the production process includes a step of plating the first material with the second material.

18. The method of claim 17, wherein the second material is electrically conductive.

19. The method of claim 13, wherein the production process includes a step of applying the surface coating to the at least one of the first and second material.

20. The method of claim 19, wherein the surface coating includes a lubricant.

* * * * *